United States Patent Office 3,842,046
Patented Oct. 15, 1974

3,842,046
POLYAMIDES OF TRIMETHYLHEXAMETHYLENE-DIAMINE CYCLOALIPHATIC DICARBOXYLIC ACID AND CARBOCYCLIC AROMATIC DICARBOXYLIC ACID
Karl Schmitt, Herne, Fritz Gude, Wanne-Eickel, and Siegfried Brandt, Herne, Germany, assignors to VEBA-Chemie Aktiengesellschaft, Gelsenkirchen-Buer, Germany
No Drawing. Original application June 26, 1969, Ser. No. 836,950, now Patent No. 3,692,749. Divided and this application July 14, 1972, Ser. No. 271,896
Int. Cl. C08g 20/20
U.S. Cl. 260—78 R
3 Claims

ABSTRACT OF THE DISCLOSURE

Polyamide of a diamine of the group 2,4,4-trimethylhexamethylenediamine, 2,2,4 - trimethylhexamethylenediamine, and mixture thereof, and dicarboxylic acid comprising cycloaliphatic dicarboxylic acid and optionally aromatic dicarboxylic acid. The polyamides are soluble in alcohols so that they are suitable for use in formulation of film forming compositions.

---

This is a division, of application Ser. No. 836,950, filed June 26, 1969, now U.S. Pat. 3,692,749.

BACKGROUND

It is known that transparent polyamides having very good mechanical properties can be obtained by the condensation of 2,4,4-trimethylhexamethylenediamine and/or 2,2,4 - trimethylhexamethylenediamine with aromatic dicarboxylic acids, especially terephthalic acid.

These types of polyamide are not soluble in ordinary solvents and behave in this regard like the crystalline polyamides. This makes it impossible to use them for many purposes, such as the manufacture of cast films, varnish films, etc.

THE INVENTION

It has now been found that polyamides having high thermal stability, which are transparent and have good solubility in alcohols, can be prepared by condensing 2,4,4 - trimethylhexamethylene diamine and/or 2,2,4-trimethylhexamethylenediamine with one or more cycloaliphatic dicarboxylic acids, mixed, if desired, with one or more aromatic dicarboxylic acids. The cycloaliphatic and aromatic dicarboxylic acid can be in the molar ratio of 25:75 to 75:25. This finding is surprising because for one thing the replacement of aromatic components in polymers by cycloaliphatic, i.e. hydroaromatic components of otherwise the same structure, results in a great reduction of thermal stability. On the other hand, the torsion modulus curve of the polyamide prepared from cyclohexane-1,4-dicarboxylic acid and trimethylhexamethylenediamine, for example, is virtually identical to the curve of the polamide prepared from terephthalic acid and trimethylhexamethylenediamine. The same applies to the softening points according to Vicat. Another cycloaliphatic acid well suited for the purposes of the invention is 1,3-cyclohexanedicarboxylic acid.

The starting product for the preparation of the diamine in question is isophorone, which is catalytically hydrogenated to 3,5,5-trimethylcyclohexanol and is then oxidized to form the isomer mixture of 1,1,3- and 1,3,3-trimethyladipic acid. To prepare an isomer mixture of 2,2,4- and 2,4,4-trimethylhexamethylenediamine, the isomeric trimethyladipic acids are converted to the corresponding dinitriles and then the compound is hydrogenated.

If it is desired to obtain pure 2,4,4- or 2,2,4-trimethylhexamethylenediamine, the isomeric trimethyladipic acids are separated by known methods and converted separately to the corresponding diamines.

Solubility in alcoholic solvents makes it possible to make polyamides prepared from cyclohexanedicarboxylic acids and trimethylhexamethylene diamine into highly filled molding compounds and into varnish films and cast films. The molding compounds, are useful for production of shaped objects, in the usual manner; the films are useful as protective coverings.

Copolyamides prepared from cyclohexandicarboxylic acids, benzenedicarboxylic acids and trimethylhexamethylenediamine, which are also transparent, have also proven interesting. The incorporation of benzenedicarboxylic acids makes it possible to control the solubility properties, so that polyamides can be prepared, for example, which can be worked in the form of a solution in higher alcohols but which are insoluble in ethanol and particularly in mixtures of ethanol and water. Copolyamides of this group, whose dicarboxylic acid content consists of 10 to 50% 1,4-cyclohexanedicarboxylic acid and 90 to 50% terephthalic acid, are characterized by an unusually high notch impact toughness.

Hexahydroterephthalic acid is an example of a dicarboxylic acid that can be used with the diamines according to this invention. If benzenedicarboxylic acids are used, terephthalic and/or isophthalic acid, for example can be used. The acid component can consist up to 90% of terephthalic acid and/or isophthalic acid.

The condensation to polyamides according to this patent application is performed under the usual conditions. For example, the dicarboxylic acid or derivative, e.g. ester, and the diamine, with or without the addition of water, or in the form of their salts or an aqueous solution of their salts which can easily be prepared by known methods, are heated slowly in a reactor to 200 to 300° C., and, after a precondensation period, the water formed by the condensation is constantly removed. The water of condensation can additionally be removed by the application of a vacuum.

Instead of the free acids, the diesters, semi-esters, acid chlorides or amides can be used according to known methods, i.e., in general those compounds which can react with diamines to yield a volatile compound and form polyamides, can be used. The molecular weights (numerical average) are to be greater than 15,000 and preferably greater than 20,000 in order to achieve the purposes of the invention.

The examples that follow shall serve to explain the present patent application. The trimethylhexamethylene diamine used in the examples is an isomeric mixture of the 2,2,4 and 2,4,4 isomers prepared as is described above.

The reduced specific viscosity ($\eta$ red) determined at 20° C. in a 1% solution in pure formic acid, shall serve as the measure of the molecular weight of the polyamides.

EXAMPLE 1

A mixture of 1563 g. of cyclohexane-1,4-dicarboxylic acid, 1443 g. of trimethylhexamethylenediamine and 2000 ml. of water is heated under nitrogen in a small pot equipped with an agitator, raising it from 100° C. to 150° C. within 5 hours, and from that to 260° C. within an additional 3 hours, 2.3 liters of water being distilled off. After 2 hours at said conditions, the mixture is stirred in a vacuum of 2 Torr at 260° C. until no more water is distilled off, and is then discharged under a nitrogen pressure of 30 atmospheres. The $\eta$ red of the polyamide amounted to 0.75, coresponding to an average molecular weight of 25–28,000.

The polyamide was dissolved in ethanol and applied to a steel plate. After air drying, during which the ethanol evaporated, a clear continuous film was obtained which showed no clouding after storage in water and did not soften at temperatures under 140° C. and which was a protective covering for the steel plate.

EXAMPLE 2

A mixture of 396 g. of cyclohexane-1,4-dicarboxylic acid, 1146 g. of terephthalic acid and 1458 g. of trimethylhexemethylenediamine is condensed as described in Example 1. The η red amounted to 0.85, corresponding to an average molecular weight of 27–30,000.

The product was disolved in hot ethanol. The solution was mixed with finely suspended kaolin powder. After drying with hot acid, a molding compound is obtained which can be formed by brief pressing at 180° C. The thermal stability of shape according to Martens runs around 120° C.

EXAMPLE 3

A mixture of 1229 g. of dimethylterephthalate, 422 g. of 1,4-cyclohexanedicarboxylic acid dimethylester, 1348 g. of trimethylhexamethylenediamine and 2000 ml. of water is boiled for 1 hour with refluxing to saponify the ester. Then the water mixed with methanol is distilled off and the remainder is condensed by 3 to 4 hours of heating at 260° C., applying a vacuum at the end. The polyamide can be worked on injection molding machines. The notch impact toughness of specimens runs around 15 to 20 kpcm./cm.$^2$.

A 35% solution of the polyamide in an alcoholic mixture of 70% by weight methanol, 10% by weight water, 20% by weight toluene is applied to a steel plate. After the film had dried, a cupping of 8.9 mm. according to Erichsen (DIN 53156) was formed, and a hardness of the film according to Buchholz (DIN 53153) of 125 was measured.

EXAMPLE 4

A mixture of 600 g. of 1,3-cyclohexanedicarboxylic acid dimethyl ester, 988 g. of isophthalic acid and 1415 g. of trimethylhexamethylenediamine and 2000 ml. of water is boiled with refluxing for 1 hour to saponify the esters. After the removal of water and methanol by distillation, the remainder is condensed by 5 hours of heating at 260° C. The polyamide can be worked both in ethanolic solution form and by injection molding. The following values were measured:

Notch impact toughness: no breakage
Ultimate bending stress: 1304 kg./cm.$^2$
Ball pressure hardness: 1630 kg./cm.$^2$
Thermal stability of shape according to Martens: 110° C.

What is claimed is:

1. Polyamide consisting essentially of polymeric condensation product of (1) 2,4,4-trimthylhexamethylenediamine, 2,2,4-trimethylhexamethylenediamine, or a mixture thereof, (2) 1,4-cyclohexane dicarboxylic acid, 1,3-cyclohexane dicarboxylic acid or a mixture thereof, and (3) benzene dicarboxylic acid, the cyclohexane and benzene dicarboxylic acids being in the molar ratio of 25:75 to 75:25, said polyamide having a numerical average molecular weight greater than 15,000 as determined by measuring the reduced viscosity of said polyamide in a 1% solution in pure formic acid at 20° C.

2. Polyamide according to claim 1, the cyclohexane acid being 1,4-cyclohexane dicarboxylic acid, the benzene acid being terephthalic acid, said acids being in the proportion of 10–50% cyclohexane acid and 90–50% benzene acid.

3. Polyamide according to claim 1, the benzene dicarboxylic acid being terephthalic acid or isophthalic acid.

References Cited

UNITED STATES PATENTS

| | | | |
|---|---|---|---|
| 2,916,475 | 12/1959 | Caldwell et al. | 260—78 R |
| 2,939,862 | 6/1960 | Caldwell et al. | 260—78 R |
| 2,965,615 | 12/1960 | Caldwell et al. | 260—78 R |
| 3,150,117 | 9/1964 | Gabler | 260—78 R |

FOREIGN PATENTS

| | | | |
|---|---|---|---|
| 619,576 | 3/1949 | Great Britain | 260—78 R |

HAROLD D. ANDERSON, Primary Examiner

U.S. Cl. X.R.

260—31.2 N, 33.4 R

UNITED STATES PATENT OFFICE
CERTIFICATE OF CORRECTION

Patent No. 3,842,046     Dated October 15, 1974

Inventor(s) Karl Schmitt, Fritz Gude and Siegfried Brandt

It is certified that error appears in the above-identified patent and that said Letters Patent are hereby corrected as shown below:

The data sheet, add:

--[30] Foreign Application Priority Data

July 2, 1968 Germany 17 70 766.3--

Signed and sealed this 11th day of February 1975.

(SEAL)
Attest:

RUTH C. MASON
Attesting Officer

C. MARSHALL DANN
Commissioner of Patents
and Trademarks